United States Patent [19]

Matsuura et al.

[11] 4,432,040
[45] Feb. 14, 1984

[54] RETRACTABLE HEAD LAMP STRUCTURE FOR AUTOMOBILES

[75] Inventors: Takashi Matsuura, Toyota; Motomu Hayashi, Okazaki; Kazuyoshi Yukimoto, Kariya, all of Japan

[73] Assignee: Aisin Seiki Kabushiki Kaisha, Kariya, Japan

[21] Appl. No.: 369,361

[22] Filed: Apr. 19, 1982

[30] Foreign Application Priority Data

Apr. 22, 1981 [JP] Japan ................. 55-058381

[51] Int. Cl.³ ............................................. B60Q 1/00
[52] U.S. Cl. ...................................... 362/61; 362/66; 362/83; 362/269; 362/272; 362/286; 362/427; 362/428; 362/287
[58] Field of Search ................. 362/65, 66, 61, 287, 362/83, 272, 427, 286, 428, 269

[56] References Cited

U.S. PATENT DOCUMENTS 2,119,892 6/1938 Snow ............................ 362/65
3,758,772 9/1973 Eyb .

Primary Examiner—Stephen J. Lechert, Jr.
Attorney, Agent, or Firm—Finnegan, Henderson, Farabow, Garrett & Dunner

[57] ABSTRACT

A retractable head lamp structure for automobiles in which a head lamp assembly is mounted on the automobile body for pivotable movement about a pivot axis between an extended position and a retracted position. In the retracted position, the lens surface of the head lamp assembly is located along the body surface. The pivot axis is inclined downwardly and rearwardly with respect to a horizontal transverse line as seen in transverse outward direction of the body so that the lens surface is substantially flush with the body surface in the retracted position.

5 Claims, 4 Drawing Figures

RETRACTABLE HEAD LAMP STRUCTURE FOR AUTOMOBILES

The present invention relates to a head lamp structure for automobiles and more particularly to a retractable automobile head lamp structure. More specifically, the present invention pertains to a retractable head lamp structure wherein the head lamp lens is placed in the retracted position along the automobile body surface so that the lens surface constitutes a part of the body surface.

In conventional automobile head lamp structures wherein the head lamp lens is adapted to be placed in the retracted position of the head lamp along the automobile body surface so that the lens surface constitutes a part of the body surface, the head lamp assembly is mounted on the automobile body for swingable movement about an axis which is horizontal and perpendicular to the optical axis of the head lamp along which the beam of light is to be projected. Therefore, depending on the curvature of the body surface, the surface of the lens of the head lamp cannot be placed satisfactorily flush with the body surface in the retracted position if the lamp assembly is properly mounted so that its projecting optical axis is disirably directed in the extended position. Thus, it has often been experienced that a discontinuous contour is produced between the body surface and the lens surface in the retracted position of the head lamp assembly causing a poor appearance of the automobile body.

It is therefore an object of the present invention to provide a retractable head lamp structure for automobiles in which the surface of the lens of the head lamp assembly can be placed substantially flush with the surface of the automobile body in the retracted position of the head lamp assembly.

Another object of the present invention is to provide a retractable head lamp structure for automobiles in which substantially no discontinuous contour is produced between the automobile body surface and the lens surface of the head lamp assembly.

According to the present invention, the above and other objects can be accomplished by an automobile including a body having a body surface, a head lamp structure comprising a head lamp assembly which includes lens means having a lens surface and adapted for projecting a beam of light along an optical axis, means for mounting said head lamp assembly on said body for movement between an extended position wherein said optical axis is directed forwardly of the automobile and a retracted position wherein the head lamp assembly is retracted into the body, said mounting means including means for supporting said head lamp assembly pivotably about a pivot axis which is inclined with respect to a transverse line extending horizontally and perpendicularly to a longitudinal centerline of the body. In a specific feature of the present invention, the pivot axis of the mounting means is inclined downwardly and rearwardly as seen in transverse outward direction of the body.

The above and other objects and features of the present invention will become apparent from the following descriptions of a preferred embodiment taking reference to the accompanying drawings, in which.

Figure 1:
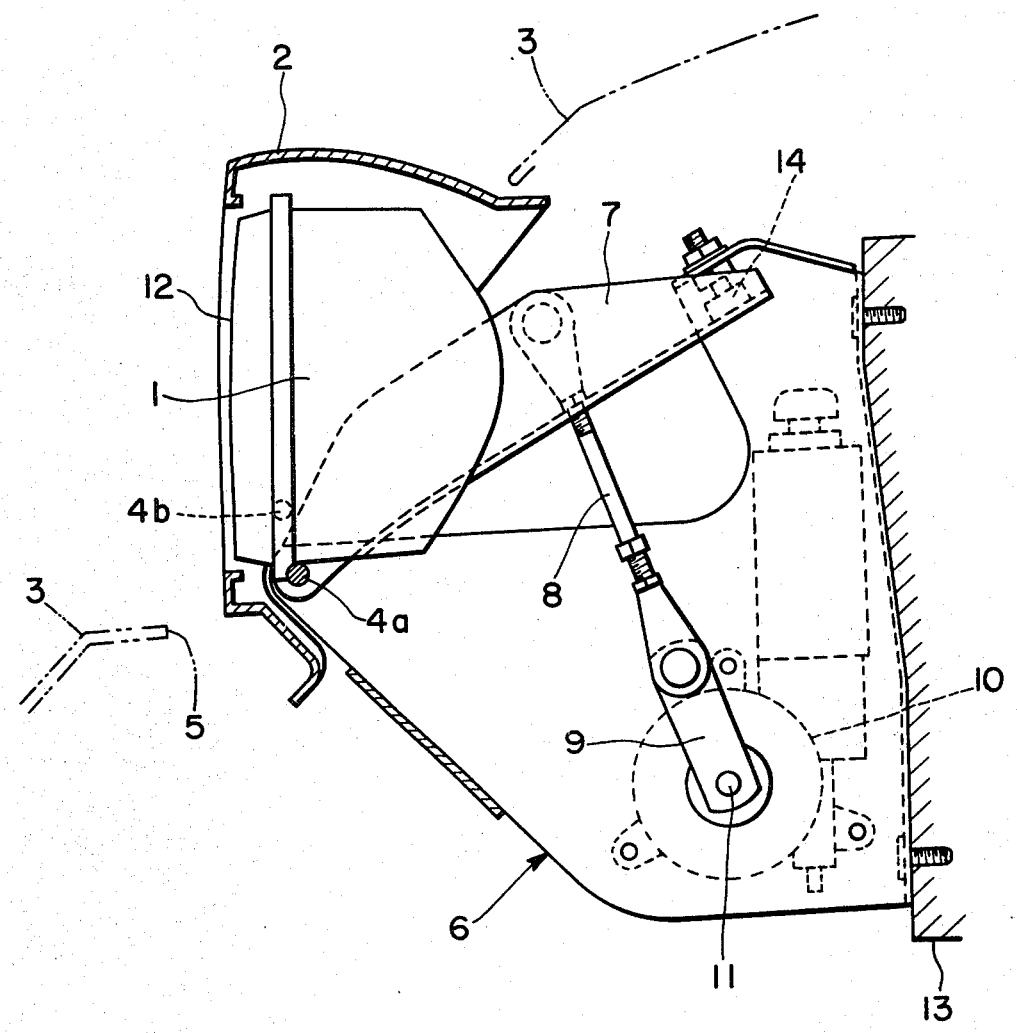
FIG. 1 is a fragmentary sectional view of a rectractable head lamp structure in accordance with one embodiment of the present invention.

Referring now to the drawings, particularly to FIG. 1, there is partially shown a hood 3 which constitutes a part of the automobile body. The hood 3 is formed with an opening 5 in which a head lamp assembly 1 is mounted. In the illustrated embodiment, the head lamp assembly 1 is mounted in a head lamp cover 2 and has a lens 2 for projecting a beam of light as well known in the art. The head lamp assembly and the head lamp cover 2 are mounted by means of a pair of axially aligned pins 4a and 4b on a bracket 6 which is secured to a part of the automobile body such as a radiator support member 13. A link member 7 is secured at one end to the head lamp assembly 1 and one end of a link rod 8 is pivotably connected with an intermediate portion of the link member 7. The other end of the link rod 8 is pivotably connected with one end of a motor link member 9, the other end of which is secured to an output shaft 11 of a motor 10. The bracket 6 is provided with an adjustable stopper 14 which is adapted to be engaged with the free end of the link member 7 when the head lamp assembly 1 and the head lamp cover 2 are in the extended position as shown in FIG. 1. It will be noted in FIG. 1 that, when the motor 10 is operated to rotate the output shaft 11 and the motor link 9 for about 180° from the position shown in FIG. 1, the head lamp assembly 1 and the head lamp cover 2 are moved to a retracted position.

Figure 2:
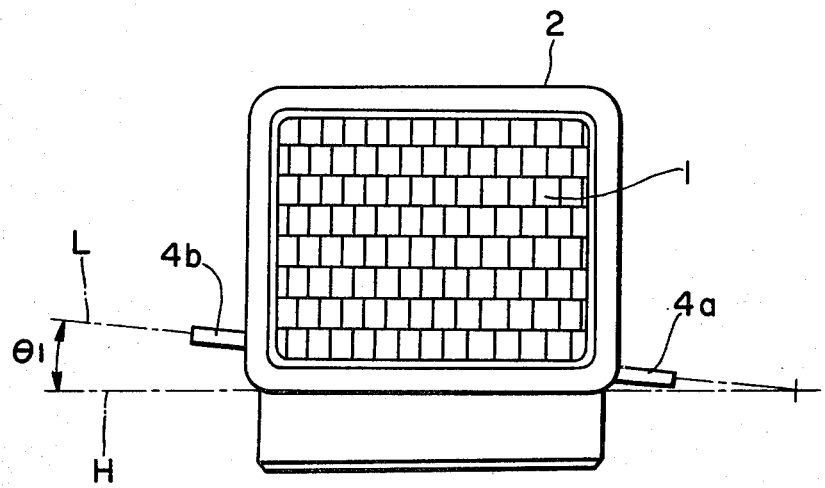
FIG. 2 is a front view of the head lamp assembly specifically showing the pivot axis for swingably mounting the same.
Figure 3:
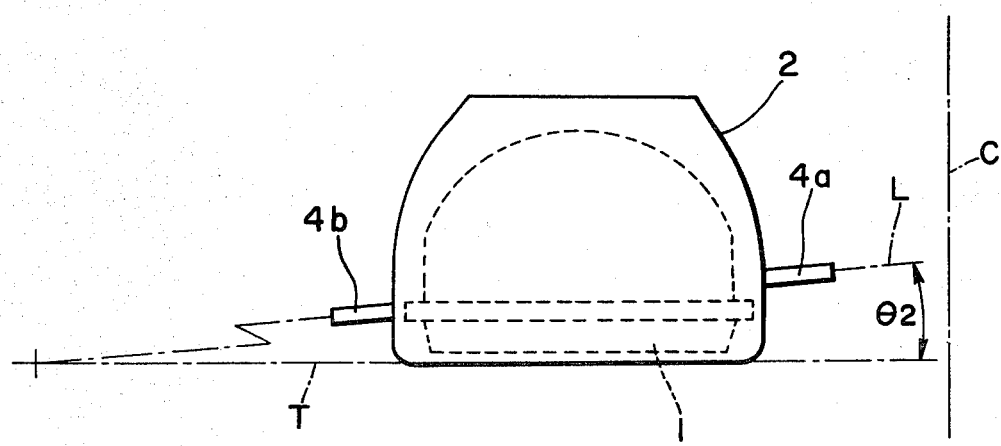
FIG. 3 is a plan view of the head lamp assembly shown in FIG. 2.
Figure 4:
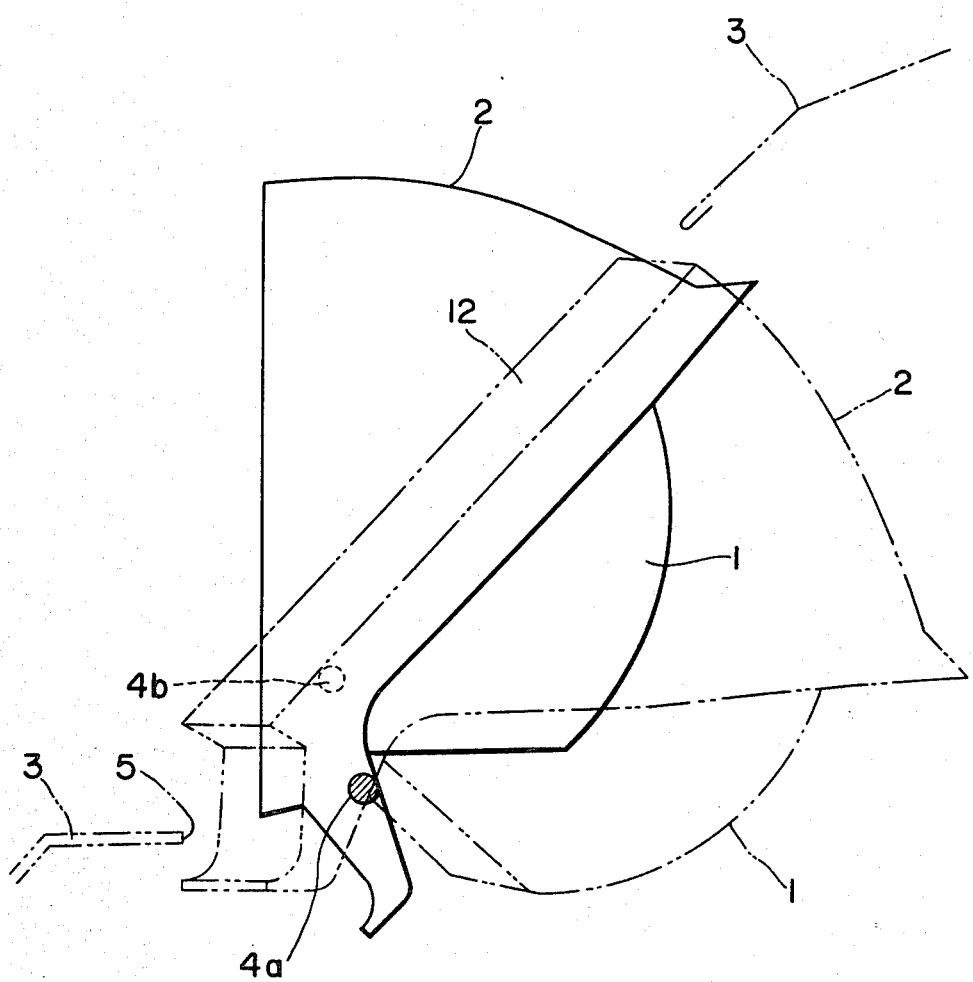
FIG. 4 is a diagrammatical illustration of the head lamp assembly in the extended and retracted positions.

Referring to FIGS. 2 and 3, it will be noted that the pivot pins 4a and 4b for mounting the head lamp assembly 1 and the head lamp cover 2 are aligned along an axis L which is inclined by an angle $\theta_1$ with respect to a horizontal line H and by an angle $\theta_2$ with respect to a transverse line T which is perpendicular to a longitudinal centerline C of the automobile body. In the illustrated embodiment, the pivot axis L is inclined downwardly and rearwardly as seen in the transverse outboard direction of the body. The angle $\theta_1$ and $\theta_2$ are suitably determined in accordance with the curvature of the hood 3 where the head lamp assembly 1 is located so that, when the head lamp assembly 1 is retracted as shown by broken lines in FIG. 4, the surface of the lens 12 is substantially flush with the surface of the hood 3 whereas, when the head lamp assembly 1 is in the extended position as shown by solid lines in FIG. 4, the lens 12 of the head lamp assembly 1 is directed properly in the forward direction. It is therefore possible to prevent the contour of the body from becoming discontinuous when the head lamp assembly 1 is retracted.

The invention has thus been shown and described with reference to a specific embodiment, however, it should be noted that the invention is in no way limited to the details of the illustrated structures but changes and modifications may be made without departing from the scope of the appended claims.

We claim:

1. An automobile head lamp structure comprising a head lamp assembly including a lens surface and means for projecting a beam of light along an optical axis, and means for mounting said head lamp assembly on the automobile for movement of the head lamp between an extended position in which said optical axis is directed forwardly of the automobile and a retracted position in which the head lamp assembly is retracted into the automobile body, said mounting means including means for supporting said head lamp assembly pivotably about a pivot axis, wherein the improvement comprises said pivot axis being inclined with respect to a transverse line extending horizontally and perpendicularly to a longitudinal centerline of the automobile.

2. An automobile head lamp structure as recited in claim 1, wherein said pivot axis of the mounting means is inclined downwardly and rearwardly with respect to said transverse line in an outward direction from a longitudinal centerline of the automobile.

3. An automobile head lamp structure as recited in claim 1, wherein said pivot axis is inclined so that the lens surface of said head lamp in the retracted position is substantially flush with the body surface of the automobile.

4. An automobile head lamp structure as recited in claim 2, wherein said pivot axis is inclined so that the lens surface of said head lamp in the retracted position is substantially flush with the body surface of the automobile.

5. An automobile head lamp structure as recited in claim 1, further comprising stopper means for adjusting the location of said head lamp in the extended position.

* * * * *